United States Patent
Nitschke et al.

[11] Patent Number: 6,130,493
[45] Date of Patent: Oct. 10, 2000

[54] TURBOGENERATOR HAVING A GENERATOR CASING AND A BUILT-IN STATOR

[75] Inventors: Thomas Nitschke, Alsheim, Germany; Daniel Hediger, Othmarsingen; Rene Meylan, Yverdon-les-Bains, both of Switzerland

[73] Assignee: ABB Patent GmbH, Mannheim, Germany

[21] Appl. No.: 09/404,495

[22] Filed: Sep. 23, 1999

[30] Foreign Application Priority Data

Sep. 23, 1998 [DE] Germany ............... 198 43 529

[51] Int. Cl.$^7$ ........................................ H02K 5/00
[52] U.S. Cl. ................ 310/89; 310/52; 310/58; 310/59; 310/254; 310/258
[58] Field of Search ................. 310/89, 90, 52, 310/57, 58, 59, 60 A, 254, 258, 64, 60

[56] References Cited

U.S. PATENT DOCUMENTS

| 3,461,328 | 8/1969 | Drouard | 310/52 |
|---|---|---|---|
| 4,426,592 | 1/1984 | Berzin et al. | 310/52 |
| 4,814,655 | 3/1989 | Kaminski | 310/59 |
| 5,796,191 | 8/1998 | Schwanda | 310/58 |

FOREIGN PATENT DOCUMENTS

| 1 171 070 | 5/1964 | Germany . |
|---|---|---|
| 1 291 017 | 3/1969 | Germany . |
| 1 638 217 | 4/1971 | Germany . |
| 22 50 969 B2 | 4/1977 | Germany . |
| 43 22 268 A1 | 1/1995 | Germany . |

Primary Examiner—Nick Ponomarenko
Assistant Examiner—Thanh Lam
Attorney, Agent, or Firm—Herbert L. Lerner; Laurence A. Greenberg; Werner H. Stemer

[57] ABSTRACT

In previously known turbogenerators, the cooling-air chambers are included in the structural configuration of the generator casing. In order to avoid complex manufacturing processes, it is intended that the chamber be a box that is separate from the generator casing. The box has an opening on its side facing the built-in stator with an edge surface of the opening being fitted with a sealing element that acts with respect to the circumferential surface of the built-in stator. The box is connected to the built-in stator with the interposition of a rubber bearing.

6 Claims, 1 Drawing Sheet

TURBOGENERATOR HAVING A GENERATOR CASING AND A BUILT-IN STATOR

BACKGROUND OF THE INVENTION

FIELD OF THE INVENTION

The invention relates to a turbogenerator having a generator casing and a built-in stator. The turbogenerator further having chambers disposed between the generator casing and the built-in stator for providing a cooling-air supply.

In previously known turbogenerators, walls running transversely with respect to the generator casing longitudinal axis are welded, at axial intervals, which can be predetermined, to the base and to the longitudinal walls of the generator casing. Walls are likewise welded in the casing upper part at the same position axially. The spaces between the walls form chambers for supplying cooling air. The transverse walls are also used to reinforce the casing. In order to reduce oscillation/vibration movements, the transverse walls are braced with respect to one another by supporting tubes. The inclusion of the cooling-air chambers in the structural configuration of the generator casing leads to complex manufacturing processes. There are thus difficulties in making the free ends of the transverse walls match one another in the region of the separation point between the casing upper part and lower part.

SUMMARY OF THE INVENTION

It is accordingly an object of the invention to provide a turbogenerator having a generator casing and a built-in stator which overcomes the above-mentioned disadvantages of the prior art devices of this general type, whose construction is simpler in the region of the chambers.

With the foregoing and other objects in view there is provided, in accordance with the invention, a turbogenerator, including:

a generator casing;

a built-in stator disposed in the generator casing and having a circumferential surface;

a sealing element; and a plurality of box-shaped chambers providing a cooling air supply disposed between the generator casing and the built-in stator, the plurality of box-shaped chambers each having a side facing the built-in stator with an opening formed in the side and the plurality of box-shaped chambers being separable from the generator casing and attached to the built-in stator, the opening defined by an edge surface being fitted with the sealing element which acts with respect to the circumferential surface of the built-in stator.

Since the chamber is a box which is separate from the generator casing, it can be manufactured independently of, and thus in parallel with, the generator casing in order to improve the throughput time. The weld beads are easily accessible during the manufacture of the generator casing, since the box is separated from the generator casing. The manufacturing complexity and material cost for the production of the chamber are reduced, since there is no longer any need to absorb supporting forces from the generator casing. The separately manufactured box can be pushed onto the built-in stator axially for fitting, so that the sealing element which is located between the built-in stator and the opening in the box can be adjusted and checked for operation in a simple manner.

The box is preferably formed from two half shells which are connected to one another at their abutment points so that, in order to simplify assembly, the two half shells can be moved into position with respect to the built-in stator, and can be connected to one another at their abutment points after being aligned.

The box, tubes and separating wall can also be prefabricated as an assembly, and pushed onto the built-in stator together. The sealing element of the separating wall in this case facilitates their alignment.

A plurality of holders are provided for attachment of the box and are each detachably or non-detachably connected to one sidewall of the box and to the circumferential surface of the built-in stator.

Another attachment option is for a bearing bolt to project from one sidewall of the box, which is supported in a bearing block associated with the built-in stator.

A rubber bearing can be disposed between the bearing bolt and the bearing block in order to damp undesirable oscillations/vibration.

Other features which are considered as characteristic for the invention are set forth in the appended claims.

Although the invention is illustrated and described herein as embodied in a turbogenerator having a generator casing and a built-in stator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
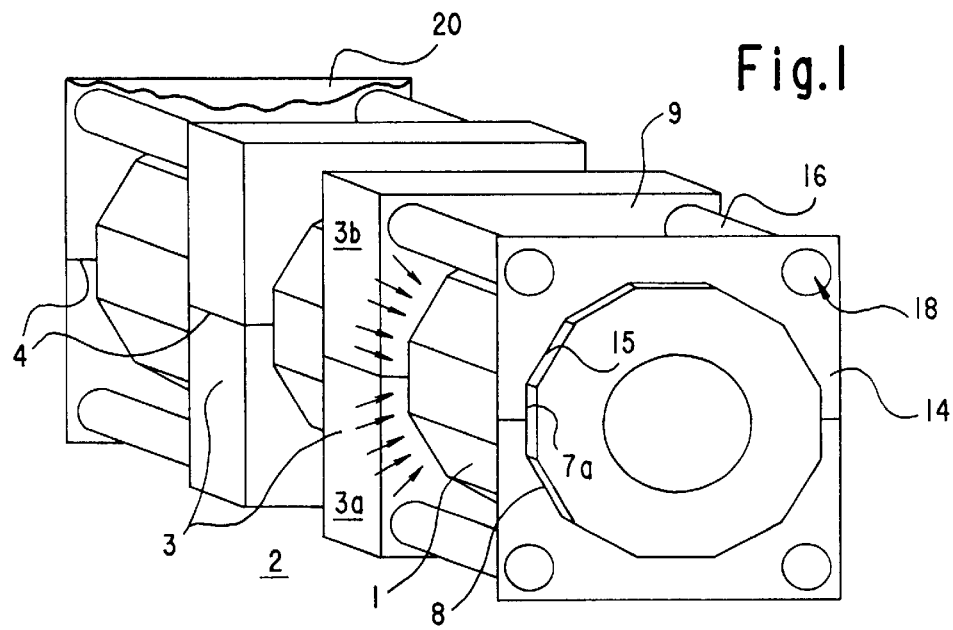
FIG. 1 is a diagrammatic, perspective, partially cut-away view of a built-in stator with components for carrying cooling air according to the invention.

In all the figures of the drawing, sub-features and integral parts that correspond to one another bear the same reference symbol in each case. Referring now to the figures of the drawing in detail and first, particularly, to FIG. 1 thereof, there is shown a built-in stator 1 of a turbogenerator 2 (which is not shown in any more detail) having a chamber 3 configured as a box 3 for supplying cooling air to a zone which can be predetermined. The number of chambers 3 can be matched to the requirement for cooling air. The exemplary embodiment illustrates two chambers 3 disposed in a row. The box 3 contains two half shells 3a, 3b which are connected to one another at their abutment point 4 in the form of a welded or screwed flange.

Figure 2:
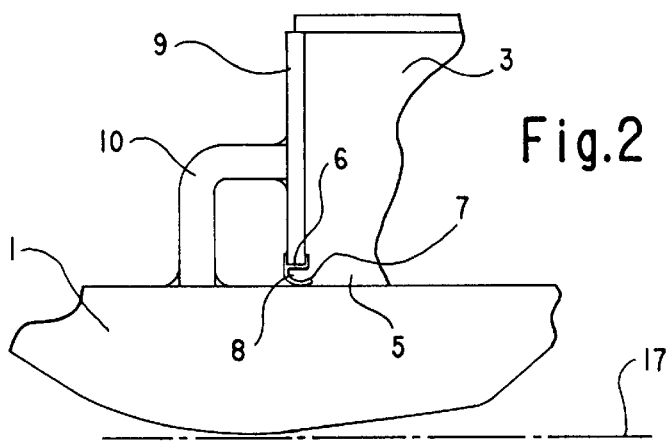
FIG. 2 is a fragmentary, partial sectional view of a sub-region from FIG. 1 with an attachment element.
Figure 3:
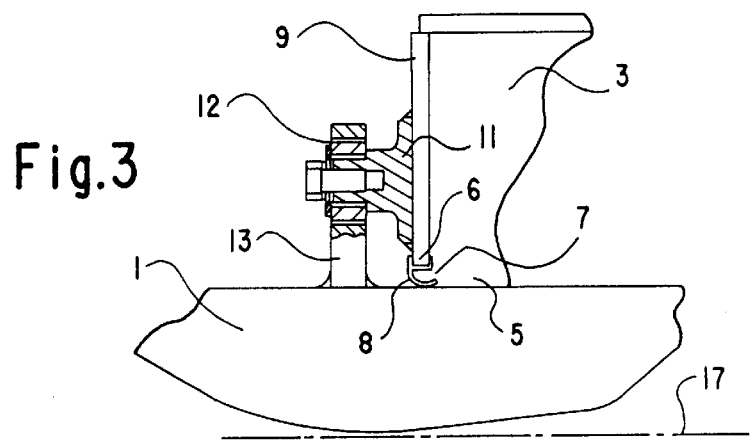
FIG. 3 is a fragmentary, partial sectional view of a differently configured attachment element.

As can be seen from FIGS. 2 and 3, that side of the box 3 which faces the built-in stator 1 has an opening 5, whose cross section corresponds to the unobstructed width of the box. An edge surface 6 of the opening 5, which has a twelve-sided contour in the same way as the circumferential surface of the built-in stator 1 leaves a gap 7 from the built-in stator 1, which gap 7 can be predetermined and is bridged by a sealing element 8. A generator longitudinal axis is denoted by 17.

Once the box 3 has been aligned relative to the built-in stator 1 by utilizing the flexibility of the sealing elements 8, a holder 10 which is welded to at least one sidewall 9 of the box 3 is, according to FIG. 2, welded to the built-in stator 1. A screwed joint may also be chosen here rather than the welded joint.

FIG. 3 shows another attachment option. A bearing bolt 11 which projects from at least one of the side walls 9 of the box 3 and is welded on there is supported in a bearing block 13 with the interposition of a rubber bearing 12, and the bearing block 13, for its part, is connected to the built-in stator 1 by welding. A plurality of such holders are provided and distributed around the circumference of the box, so that this provides a reliable attachment, which provides decoupling for oscillations and vibration, for the chamber which is separated from a generator casing 20.

A separating wall 14 (FIG. 1) is likewise associated with the built-in stator 1 at a distance from the box 3 that can be predetermined. Its twelve-sided edge 15 facing the built-in stator 1 is provided with the same sealing element 8 as the edge surface 6 of the box 3, in order to bridge a gap 7a. The separating wall 14 is used for supporting tubes 16 which are introduced in the side wall 9 and are used for supplying cooling air in the direction of arrow 18. In an analogous way to the details in FIGS. 2 and 3, the separating wall 14 is detachably or non-detachably connected to the built-in stator 1.

After its production separately from the manufacture of the generator casing 20, the unit containing the box 3, the separating wall 14 and the tubes 16 can be pushed onto the built-in stator 1 and, once it has been positioned, can be anchored. The box can also be moved into position relative to the built-in stator 1 in the form of half shells before the abutment points are then connected.

We claim:

1. A turbogenerator, comprising:

a generator casing;

a built-in stator disposed in said generator casing and having a circumferential surface;

a sealing element; and a plurality of box-shaped chambers providing a cooling air supply disposed between said generator casing and said built-in stator, said plurality of box-shaped chambers each having a side facing said built-in stator with an opening formed in said side and said plurality of box-shaped chambers being separable from said generator casing and attached to said built-in stator, said opening defined by an edge surface being fitted with said sealing element which acts with respect to said circumferential surface of said built-in stator.

2. The turbogenerator according to claim 1, wherein said plurality of box-shaped chambers are each formed of two half shells having abutment points and are connected to one another at said abutment points.

3. The turbogenerator according to claim 1, wherein said plurality of box-shaped chambers each have a side wall and including tubes opening into said side wall and used for conducting the cooling air supply to said plurality of box-shaped chambers, and further including a further sealing element and a separating wall having an edge facing said built-in stator and supporting said tubes, said separating wall fitted with said further sealing element on said edge and attached to said built-in stator.

4. The turbogenerator according to claim 1, wherein said plurality of box-shaped chambers each have side walls and including a plurality of holders attached in one of a detachably and a non-detachably connection to at least one of said side walls and to said circumferential surface of said built-in stator.

5. The turbogenerator according to claim 1, wherein said plurality of box-shaped chambers each have side walls, and including a bearing block associate with said built-in stator and a bearing bolt projecting from at least one of said side walls and supported in said bearing block.

6. The turbogenerator according to claim 5, including a rubber bearing disposed between said bearing bolt and said bearing block.

* * * * *